United States Patent Office 2,926,194
Patented Feb. 23, 1960

2,926,194
PHOSPHINE BORINE COMPOUNDS AND THEIR PREPARATION

Anton B. Burg, Los Angeles, and Ross I. Wagner, Montebello, Calif., assignors, by mesne assignments, to American Potash & Chemical Corporation, a corporation of Delaware No Drawing. Application June 17, 1957
Serial No. 666,208

11 Claims. (Cl. 260—606.5)

This invention which is a continuation-in-part of our copending application, Serial No. 446,148, filed July 27, 1954, now abandoned relates in general to certain novel compositions of matter and processes for their manufacture. More particularly, this invention relates to phosphine borines, useful as intermediates in the manufacture of phosphinoborines which, in turn, as set forth in our copending application, Serial No. 666,213, filed even date herewith, are useful for many purposes. The conversion of the phosphine borines of this invention to the useful phosphinoborines is also described in application Serial No. 446,147, filed July 27, 1954, now abandoned, and in the divisional application thereof, identified as application Serial No. 754,914, filed August 14, 1958. The phosphine borines to which this invention is directed have the formula $RR'HP:BH_3$ where R and R' are aliphatic or aromatic radicals, at least one of these being a ring, either an alicyclic or aromatic radical.

Generally, it has been found that certain phosphine borines may be pyrolyzed to yield phosphinoborines as set forth in our copending application aforementioned from certain corresponding phosphine borines. However, if a phosphinoborine is to be obtained by the pyrolysis route, certain requirements must be met in the phosphine borine used. First, the phosphine borine must have only hydrogens bonded to the boron atom. Where hydrocarbon radicals are bonded to the boron, the phosphine borine undergoes disproportionation at temperatures less than those required for the loss of a hydrogen from both the phosphorous and boron. This disproportionation will result in the formation of a phosphine trialkylborine or a phosphine triarylborine which may not thereafter effectively be pyrolyzed—as no hydrogens are present on the boron to be lost during the pyrolysis procedure. Such phosphine trialkylborines and phosphine triarylborines are of little value. Another requirement is that a single hydrogen be bonded to the phosphorous. Where more than a single hydrogen is bonded to the phosphorous, pyrolysis of the phosphine borine will result in the loss of more than one hydrogen from the phosphorous and the consequent formation of a highly cross linked glassy material. Such products are entirely unlike the trimeric phosphinoborines set forth in the aforementioned copending application and may not be used in the same applications as may the trimeric materials. However, if three hydrocarbon groups are bonded to the phosphorous and no hydrogen is present, pyrolysis will not drive off a group from the phosphorous and the phosphinoborine polymer cannot be formed.

It is therefore an object of this invention to provide for the preparation of phosphine borines which may be used to prepare phosphinoborines by pyrolysis.

More particularly, it has been found that phosphine borines having the general formula $RR'HP:BH_3$, where the various symbols are used in the fashion set forth earlier, may be formed which are of value in the preparation of phosphinoborines by pyrolysis. Preferred phosphine borines falling within the scope of this invention are those of the formula given above, wherein R and R' are alkyl radicals having less than 13 carbon atoms, lower cycloalkyl, phenyl, lower alkyl-substituted phenyl, lower alkenyl, biphenyl, naphthyl or lower cycloalkenyl, it being necessary that at least one of the symbols R or R' represents phenyl, lower alkyl-substituted phenyl, lower cycloalkyl, lower cycloalkenyl, biphenyl or naphthyl. The desired phosphine borine is prepared by placing the phosphine and the borine, or sources thereof, in a reaction vessel in such a fashion that the reactants are in contact with each other. Under suitable temperature conditions, a reaction occurs between the phosphine and the borine with the phosphine borine being formed as the addition product. Reaction between the phosphine and borine in the preparation of the phosphine borine is carried out in the presence of a nonoxidizing atmosphere or in a vacuum and in the absence of moisture. To ensure this, the reaction vessels may conveniently be flushed beforehand with nitrogen or similar inert gas or be evacuated.

Generally speaking, the reaction is exothermic and tends to occur vigorously. The reaction may be at least partially controlled by the use of a suitable external cooling means, or use of suitable diluents which serve to prevent the temperature of the reaction from becoming unduly high and may act as solvent media for the reactants, or by using both external cooling and a diluent.

The reactor should be constructed of the material which is corrosion resistant and has sufficient strength to withstand the temperatures and pressures that may occur during the reaction. Where the reaction is carried out on a small scale, a heat resistant flask is suitable for use as a reactor.

Various examples as set forth below for illustrative purposes are not to be construed as imposing limitations on the scope of the invention other than as set out in the appended claims.

Example I.—Into a 300 ml. bulb which had been evacuated and which was maintained at $-196°$ C. were placed 0.870 g. diphenylphosphine followed by 0.073 g. diborane. The bulb was then allowed to warm to initiate the reaction. The addition compound, diphenylphosphine borine, $(C_6H_5)_2HP:BH_3$, was secured in a quantitative yield. The excess $B_2H_6$ was removed under vacuum.

Example II.—Into a 300 ml. bulb maintained at $-196°$ C. were distilled 19.8 g dicyclohexylphosphine. Thereafter a mixture of nitrogen and diborane were led into the flask and the temperature allowed to increase slowly throughout the addition period. A total of 1.41 g. diborane were consumed. The addition compound dicyclohexylphosphine borine, $(C_6H_{11})_2HP:BH_3$, was secured in good yield.

| Example No. | Phosphine | Grams | Grams Diborane | Initial Reaction Vessel Temperature, ° C. | Phosphine Borine Product |
|---|---|---|---|---|---|
| III | $(C_7H_{13})_2PH$ | 2.03 | 0.13 | −196 | $(C_7H_{13})_2HP:BH_3$. |
| IV | $(C_5H_9)_2PH$ | 13.60 | 1.16 | −196 | $(C_5H_9)_2HP:BH_3$. |
| V | $C_6H_{11}(CH_3)PH$ | 7.80 | 0.87 | −70 | $C_6H_{11}(CH_3)HP:BH_3$. |
| VI | $C_6H_5(C_8H_{17})PH$ | 2.38 | 0.16 | −196 | $C_6H_5(C_8H_{17})HP:BH_3$. |
| VII | $C_6H_{11}(C_5H_{11})PH$ | 0.84 | 0.07 | −196 | $C_6H_{11}(C_5H_{11})HP:BH_3$. |
| VIII | $C_6H_5(n-C_3H_7)PH$ | 7.30 | 0.64 | −78 | $C_6H_5(n-C_3H_7)HP:BH_3$. |
| IX | $C_6H_5(n-C_{12}H_{25})PH$ | 2.04 | 0.10 | −78 | $C_6H_5(n-C_{12}H_{25})HP:BH_3$. |
| X | $C_6H_5(CH_3)PH$ | 2.01 | 0.24 | −196 | $C_6H_5(CH_3)HP:BH_3$. |
| XI | $(p-CH_3C_6H_5)_2PH$ | 2.02 | 0.34 | −30 | $(p-CH_3C_6H_5)_2HP:BH_3$. |
| XII | $(p-C_6H_5C_6H_4)_2PH$ | 10.95 | 0.51 | −20 | $(p-C_6H_5C_6H_4)_2HP:BH_3$. |
| XIII | $p-C_6H_5C_6H_4(CH_3)PH$ | 2.63 | 0.20 | −40 | $p-C_6H_5C_6H_4(CH_3)HP:BH_3$. |
| XIV | $(2-C_{10}H_7)_2PH$ | 1.75 | 0.16 | −20 | $(2-C_{10}H_7)_2HP:BH_3$. |
| XV | $2-C_{10}H_7(CH_3)PH$ | 2.26 | 0.19 | −35 | $2-C_{10}H_7(CH_3)HP:BH_3$. |
| XVI | $C_6H_{11}(CH_2=CHCH_2)HP$ | 8.58 | 0.81 | −78 | $C_6H_{11}(CH_2=CHCH_2)HP:BH_3$. |
| XVII | $C_6H_5(CH_2=CHCH_2)HP$ | 12.56 | 1.29 | −78 | $C_6H_5(CH_2=CHCH_2)HP:BH_3$. |
| XVIII | $C_5H_5(CH_3)HP$ | 7.78 | 0.98 | −78 | $C_5H_5(CH_3)HP:BH_3$. |

Obviously many modifications and variations of the invention as hereinbefore set forth may be made without departing from the spirit and scope thereof, and therefore only such limitations should be imposed as are indicated in the appended claims.

We claim:

1. A phosphine borine having the general formula RR'HP:BH$_3$ wherein R and R' are selected from the class consisting of alkyl radicals having less than 13 carbon atoms, lower cycloalkyl, phenyl, lower alkyl-substituted phenyl, lower alkenyl, biphenyl, naphthyl and lower cycloalkenyl, at least one of said R and R' being selected from the class consisting of phenyl, lower alkyl-substituted phenyl, lower cycloalkyl, lower cycloalkenyl, biphenyl and naphthyl.

2. The phosphine borine of claim 1 wherein R is an alkyl radical having less than 13 carbon atoms.

3. The phosphine borine of claim 1 wherein at least one of R and R' is lower alkyl-substituted phenyl.

4. The phosphine borine of claim 1 wherein at least one of said R and R' is lower cycloalkyl.

5. Diphenylphosphine borine.

6. Phenylmethylphosphine borine.

7. Bis(p-tolyl)phosphine borine.

8. Phenylethylphosphine borine.

9. Dicyclohexylphosphine borine.

10. A phosphine borine of the general formula R(C$_6$H$_5$)HP:BH$_3$, wherein R is selected from the class consisting of alkyl radicals having less than 13 carbon atoms, lower cycloalkyl, phenyl, lower alkyl-substituted phenyl, lower alkenyl, lower cycloalkenyl, biphenyl and naphthyl.

11. A phosphine borine having the general formula R(CH$_3$C$_6$H$_5$)HP:BH$_3$ wherein R is selected from the class consisting of alkyl radicals having less than 13 carbon atoms, lower cycloalkyl, phenyl, lower alkyl-substituted phenyl, lower alkenyl, lower cycloalkenyl, biphenyl and naphthyl.

References Cited in the file of this patent

Burg et al.: "Amer. Chem. Soc. Jour.," vol. 75, pp. 3872–7 (1953).

Hewitt et al.: "J. Chem. Soc. (London)," pages 530–4 (1953). Publ. Feb. 1953; received in Patent Office Library, April 1, 1953.